US009038855B2

(12) United States Patent
Lurcott et al.

(10) Patent No.: US 9,038,855 B2
(45) Date of Patent: May 26, 2015

(54) FLUID PROCESSING SYSTEMS AND METHODS

(75) Inventors: Steven M. Lurcott, Sherman, CT (US); John E. Q. Hughes, Phoenix, AZ (US); Peter Wrschka, Phoenix, AZ (US); Thomas H. Baum, New Fairfield, CT (US); Donald D. Ware, Woodbury, MN (US); Peng Zou, Ridgefield, CT (US)

(73) Assignee: Advanced Technology Materials, Inc., Billerica, MA (US)

(*) Notice: Subject to any disclaimer, the term of this patent is extended or adjusted under 35 U.S.C. 154(b) by 229 days.

(21) Appl. No.: 13/375,462

(22) PCT Filed: Jun. 8, 2010

(86) PCT No.: PCT/US2010/037759
§ 371 (c)(1), (2), (4) Date: Feb. 16, 2012

(87) PCT Pub. No.: WO2010/144439
PCT Pub. Date: Dec. 16, 2010

(65) Prior Publication Data

US 2012/0138631 A1 Jun. 7, 2012

Related U.S. Application Data

(60) Provisional application No. 61/185,817, filed on Jun. 10, 2009.

(51) Int. Cl.
*G01F 11/00* (2006.01)
*B01F 15/02* (2006.01)
(Continued)

(52) U.S. Cl.
CPC ........... *B01F 15/0203* (2013.01); *B01F 3/0861* (2013.01); *B01F 15/0258* (2013.01); *B01F 2003/0896* (2013.01); *B67D 7/025* (2013.01); *B67D 7/0283* (2013.01)

(58) Field of Classification Search
USPC ............... 222/1, 23, 61, 71, 94–95, 105, 107, 222/131, 135–136, 145.5, 152, 183, 386.5, 222/399, 318; 141/10, 59, 65
See application file for complete search history.

(56) References Cited

U.S. PATENT DOCUMENTS 4,723,969 A * 2/1988 DeMarco ........................ 95/284
4,818,706 A * 4/1989 Starr ............................ 436/180
4,854,481 A * 8/1989 Bohl et al. ...................... 222/94
(Continued)

FOREIGN PATENT DOCUMENTS

CN 1665718 A 9/2005
EP 0389191 A1 9/1990
(Continued)

*Primary Examiner* — Frederick C. Nicolas
(74) *Attorney, Agent, or Firm* — Christensen Fonder P.A.

(57) ABSTRACT

Systems and methods for delivering fluid-containing feed materials to process equipment are disclosed. A liner-based pressure dispensing vessel is subjected to filling by application of vacuum between the liner and overpack. Multiple feed material flow controllers of different calibrated flow ranges may be selectively operated in parallel for a single feed material. Feed material blending and testing for scale-up may be performed with feed materials supplied by multiple liner-based pressure dispensing containers. A gravimetric system may be used to determine concentration of at least one component of a multi-component solution or mixture.

18 Claims, 9 Drawing Sheets

(51) Int. Cl.
*B01F 3/08* (2006.01)
*B67D 7/02* (2010.01)

(56) References Cited

U.S. PATENT DOCUMENTS

| | | | | |
|---|---|---|---|---|
| 4,854,483 | A * | 8/1989 | Haggart | 222/95 |
| 5,148,945 | A | 9/1992 | Geatz | |
| 5,343,901 | A | 9/1994 | Meshberg | |
| 5,408,832 | A | 4/1995 | Boffito et al. | |
| 5,447,183 | A * | 9/1995 | Derby | 141/67 |
| 5,526,957 | A * | 6/1996 | Brown et al. | 222/94 |
| 5,636,762 | A * | 6/1997 | Juhola et al. | 222/1 |
| 5,673,818 | A * | 10/1997 | Kaneski et al. | 222/105 |
| 5,899,362 | A * | 5/1999 | Moran | 222/136 |
| 6,019,250 | A | 2/2000 | Pozniak et al. | |
| 6,062,430 | A * | 5/2000 | Fuchs | 222/105 |
| 6,168,048 | B1 * | 1/2001 | Xu et al. | 222/1 |
| 6,257,844 | B1 * | 7/2001 | Stern | 417/383 |
| 6,698,619 | B2 | 3/2004 | Wertenberger | |
| 6,708,502 | B1 | 3/2004 | Aceves et al. | |
| 6,789,699 | B2 * | 9/2004 | Clark et al. | 222/94 |
| 6,796,703 | B2 | 9/2004 | Lemke | |
| 6,923,568 | B2 | 8/2005 | Wilmer et al. | |
| 7,007,822 | B2 | 3/2006 | Forshey et al. | |
| 7,143,774 | B2 | 12/2006 | Lull et al. | |
| 7,188,644 | B2 | 3/2007 | Kelly et al. | |
| 7,204,679 | B2 * | 4/2007 | Wheeler | 417/390 |
| 8,507,382 | B2 * | 8/2013 | Hughes et al. | 438/692 |
| 2003/0205285 | A1 | 11/2003 | Kelly et al. | |
| 2004/0106355 | A1 | 6/2004 | Lujan et al. | |
| 2008/0265059 | A1 | 10/2008 | Escoto et al. | |
| 2010/0025430 | A1 | 2/2010 | Cisewski et al. | |
| 2010/0128555 | A1 * | 5/2010 | Hughes | 366/132 |
| 2010/0224264 | A1 | 9/2010 | Homan et al. | |
| 2011/0126936 | A1 * | 6/2011 | Dawson et al. | 141/10 |
| 2011/0226806 | A1 | 9/2011 | O'Dougherty et al. | |

FOREIGN PATENT DOCUMENTS

| | | | |
|---|---|---|---|
| EP | 1391416 | A1 | 2/2004 |
| JP | 09-122464 | A | 5/1997 |
| WO | WO 99/56057 | A1 | 11/1999 |
| WO | WO2005/068325 | A1 | 7/2005 |
| WO | WO 2005/068325 | A1 | 7/2005 |
| WO | 2006133026 | A2 | 12/2006 |
| WO | 2007002288 | A2 | 1/2007 |
| WO | 2008095024 | A1 | 8/2008 |
| WO | WO 2008/141206 | A2 | 11/2008 |

* cited by examiner

| COM-PONENT | MFCs | | ON OR OFF? | TOTAL FLOW | INDIVIDUAL FLOW RATES | CONCEN-TRATION | PRECISION FOR TOTAL FLOW | |
|---|---|---|---|---|---|---|---|---|
| | max flow (ml/min) | std.dev. (ml/min) | | (ml/min) | (ml/min) | (wt.%) | std.dev. (ml/min) | % std.dev. (%) |
| DI water | 250 | 2.5 | 1 | 300 | 240 | 80 | 2.60 | 0.87 |
| DI water | 125 | 1.25 | 0 | | 0 | | | |
| Chem A | 50 | 0.5 | 1 | | 45 | 15 | | |
| Chem B | 50 | 0.5 | 1 | | 15 | 5 | | |

*0: off*
*1: on*

*300*
*total*

FIG.5A

| COM-PONENT | MFC's | | ON OR OFF? | TOTAL FLOW | INDIVIDUAL FLOW RATES | TARGET CONCEN-TRATION | ACTIAL CONCETRATION CONSIDERING VARIATIONS | DEVIATION FROM TARGET CONCEN-TRATION |
|---|---|---|---|---|---|---|---|---|
| | max flow (ml/min) | std.dev. (ml/min) | | (ml/min) | (ml/min) | (wt.%) | (wt.%) | (%) |
| DI water | 250 | 2.5 | 1 | 300 | 242.5 | 80 | 80.4 | 0.54 |
| DI water | 125 | 1.25 | 0 | | 0 | | | |
| Chem A | 50 | 0.5 | 1 | | 44.5 | 15 | 14.8 | −1.60 |
| Chem B | 50 | 0.5 | 1 | | 14.5 | 5 | 4.8 | −3.81 |

*0: off*
*1: on*

*301.5*
*total*

FIG.5B

| COM-PONENT | MFC's | | ON OR OFF? | TOTAL FLOW | INDIVIDUAL FLOW RATES | CONCEN-TRATION | PRECISION FOR TOTAL FLOW | |
|---|---|---|---|---|---|---|---|---|
| | max flow (ml/min) | std.dev. (ml/min) | | (ml/min) | (ml/min) | (wt.%) | std.dev. (ml/min) | % std.dev. (%) |
| DI water | 250 | 2.5 | 1 | 400 | 230 | 82.5 | 2.88 | 0.72 |
| DI water | 125 | 1.25 | 1 | | 100 | | | |
| Chem C | 50 | 0.5 | 1 | | 40 | 10.0 | | |
| Chem D | 50 | 0.5 | 1 | | 30 | 7.5 | | |

*0: off*
*1: on*

*400*
*total*

FIG.5C

| COM-PONENT | MFC's | | ON OR OFF? | TOTAL FLOW | INDIVIDUAL FLOW RATES | TARGET CONCEN-TRATION | ACTIAL CONCETRATION CONSIDERING VARIATIONS | DEVIATION FROM TARGET CONCEN-TRATION |
|---|---|---|---|---|---|---|---|---|
| | max flow (ml/min) | std.dev. (ml/min) | | (ml/min) | (ml/min) | (wt.%) | (wt.%) | (%) |
| DI water | 250 | 2.5 | 1 | 400 | 232.5 | 82.5 | 82.87 | 0.45 |
| DI water | 125 | 1.25 | 1 | | 101.25 | | | |
| Chem C | 50 | 0.5 | 1 | | 39.5 | 10 | 9.81 | −1.92 |
| Chem D | 50 | 0.5 | 1 | | 29.5 | 7.5 | 7.32 | −2.34 |

*0: off*
*1: on*

*402.75*
*total*

FIG.5D

| COMPONENT | MFC's | | ON OR OFF? | TOTAL FLOW | INDIVIDUAL FLOW RATES | TARGET CONCEN-TRATION | ACTIAL CONCETRATION CONSIDERING VARIATIONS | DEVIATION FROM TARGET CONCEN-TRATION |
|---|---|---|---|---|---|---|---|---|
| | max flow (ml/min) | std.dev. (ml/min) | | (ml/min) | (ml/min) | (wt.%) | (wt.%) | (%) |
| DI water | 500 | 5 | 1 | 400 | 335 | 82.5 | 82.92 | 0.51 |
| DI water | 125 | 1.25 | 0 | | 0 | | | |
| Chem C | 50 | 0.5 | 1 | | 39.5 | 10 | 9.78 | −2.23 |
| Chem D | 50 | 0.5 | 1 | | 29.5 | 7.5 | 7.30 | −2.64 |

*0: off*
*1: on*

*404 total*

FIG.5E

| COMPONENT | MFC's | | ON OR OFF? | TOTAL FLOW | INDIVIDUAL FLOW RATES | TARGET CONCEN-TRATION | ACTIAL CONCETRATION CONSIDERING VARIATIONS | DEVIATION FROM TARGET CONCEN-TRATION |
|---|---|---|---|---|---|---|---|---|
| | max flow (ml/min) | std.dev. (ml/min) | | (ml/min) | (ml/min) | (wt.%) | (wt.%) | (%) |
| DI water | 250 | 2.5 | 0 | 200 | 0 | 82.5 | 83.02 | 0.63 |
| DI water | 125 | 1.25 | 1 | | 166.25 | | | |
| Chem C | 50 | 0.5 | 1 | | 19.5 | 10 | 9.74 | −2.62 |
| Chem D | 50 | 0.5 | 1 | | 14.5 | 7.5 | 7.24 | −3.45 |

*0: off*
*1: on*

*200.25 total*

FIG.5F

| COMPONENT | MFC's | | ON OR OFF? | TOTAL FLOW | INDIVIDUAL FLOW RATES | TARGET CONCEN-TRATION | ACTIAL CONCETRATION CONSIDERING VARIATIONS | DEVIATION FROM TARGET CONCEN-TRATION |
|---|---|---|---|---|---|---|---|---|
| | max flow (ml/min) | std.dev. (ml/min) | | (ml/min) | (ml/min) | (wt.%) | (wt.%) | (%) |
| DI water | 500 | 5 | 1 | 200 | 170 | 82.5 | 83.33 | 1.01 |
| DI water | 125 | 1.25 | 0 | | 0 | | | |
| Chem C | 50 | 0.5 | 1 | | 19.5 | 10 | 9.56 | −4.41 |
| Chem D | 50 | 0.5 | 1 | | 14.5 | 7.5 | 7.11 | −5.23 |

*0: off*
*1: on*

*204*
*total*

FIG.5G

FLUID PROCESSING SYSTEMS AND METHODS

CROSS-REFERENCE TO RELATED APPLICATION(S)

This application is filed under the provisions of 35 U.S.C. 371 and claims the priority of International Patent Application No. PCT/US2010/037759 filed on Jun. 8, 2010, and further claims priority of U.S. Provisional Patent Application No. 61/185,817 filed on Jun. 10, 2009. The disclosures of the foregoing international patent application and U.S. provisional patent application are hereby incorporated by reference herein in their respective entireties.

FIELD OF THE INVENTION

The present invention relates to systems and methods for delivery of fluid-containing process materials to fluid-utilizing processes, including (but not limited to) processes employed in semiconductor and microelectronic device fabrication, and manufacturing of products incorporating such systems and methods.

BACKGROUND

Delivery of fluid-containing feed materials to process equipment (e.g., process tools) is routinely performed in a variety of manufacturing processes. Numerous industries require that feed materials be provided in ultra-pure form and substantially free of contaminants. The term "feed material" in this context refers broadly to any of various materials used or consumed in manufacturing and/or industrial processes.

In the context of manufacturing semiconductors, microelectronic devices, and/or components or precursors thereof, the presence of even small amounts of certain contaminants can render a resulting product deficient, or even useless, for its intended purpose. Accordingly, delivery systems (e.g., including containers and delivery components) used to supply feed materials to such manufacturing equipment must be of a character that avoids contamination issues. Material delivery containers must be rigorously clean in condition, while avoiding particle shedding, outgassing, and any other form of imparting contaminants from the containers and delivery components to feed materials contained within or otherwise disposed in contact therewith. Material delivery systems should desirably maintain feed material in a pure state, without degradation or decomposition of the contained material, given that exposure of feed materials to ultraviolet light, heat, environmental gases, process gases, debris, and impurities may impact such materials adversely. Certain feed materials may interact with one another in undesirable ways (e.g., chemical reaction or precipitation), such that combined storage of such constituents should be avoided. As pure feed materials can be quite expensive, waste of such materials should be minimized Exposure to toxic and/or hazardous feed materials should also be avoided.

As a result of these considerations, many types of high-purity packaging have been developed for liquids and liquid-containing compositions used in microelectronic device manufacturing, such as photoresists, etchants, chemical vapor deposition reagents, solvents, wafer and tool cleaning formulations, chemical mechanical planarization (CMP) compositions, color filtering chemistries, overcoats, liquid crystal materials, etc. Reactive fluids may be used in certain applications, and compositions including multiple different fluids, and/or fluid-solid compositions may be useful.

One type of high-purity packaging that has come into such usage includes a rigid or semi-rigid overpack containing a liquid or liquid-based composition in a flexible liner or bag that is secured in position in the overpack by retaining structure such as a lid or cover. Such packaging is commonly referred to as "bag-in-can" (BIC), "bag-in-bottle" (BIB) and "bag-in-drum" (BID) packaging. Packaging of such general type is commercially available under the trademark NOWPAK from ATMI, Inc. (Danbury, Conn., USA). Preferably, a liner comprises a flexible material, and the overpack container comprises a wall material that is substantially more rigid than said flexible material. The rigid or semi-rigid overpack of the packaging may for example be formed of a high-density polyethylene or other polymer or metal, and the liner may be provided as a pre-cleaned, sterile collapsible bag of a single layer or multi-layer laminated film materials, including polymeric materials such as such as polytetrafluoroethylene (PTFE), low-density polyethylene, PTFE-based multilaminates, polyamide, polyester, polyurethane, or the like, selected to be inert to the contained liquid or liquid-based material to be contained in the liner. Exemplary materials of construction of a liner further include: metallized films, foils, polymers/copolymers, laminates, extrusions, co-extrusions, and blown and cast films.

In dispensing operation involving certain liner-based packages of liquids and liquid-based compositions, contents may be dispensed from the liner by connecting a dispensing assembly (optionally including a dip tube or short probe immersed in the contained liquid) to a port of the liner. After the dispensing assembly has been thus coupled to the liner, fluid (e.g., gas) pressure is applied on the exterior surface of the liner, so that it progressively collapses and forces liquid through the dispensing assembly due to such pressure dispensing for discharge to associated flow circuitry for flow to an end-use site.

A problem incident to the use of pressure dispensing packages is permeation or in-leakage of gas into the contained liquid, and solubilization and bubble formation in the liquid. In the case of liner-based packages, pressurizing gases between the liner and overpack may permeate through the liner into the contained liquid, where such gases may be dissolved. When the liquid subsequently is dispensed, pressure drop in the dispensing lines and downstream instrumentation and equipment may cause liberation of formerly dissolved gas, resulting in the formation of bubbles in the stream of dispensed liquid, with adverse effects on the downstream process. It would therefore be desirable to minimize migration of headspace gas into contained fluid in a liner-based dispensing container.

When dispensing fluids subject to wide variation in desired flow rate, it may be challenging to provide a desirably wide range of flow without sacrificing flow control accuracy or precision. It would be desirable to accurately control dispensation of one or more fluids (including multiple fluids supplied as a mixture) over a wide range of desired flow rates.

In the context of providing multi-component formulations for industrial or commercial use, it may be difficult to rapidly provide a wide variety of formulations for desired processes, while avoiding waste of source materials and minimizing need for cleaning of constituent storage and/or dispensing components. It would be desirable to overcome these difficulties.

When dispensing multi-component formulations including one or more components that may be subject to decomposition with respect to time, it may be difficult or cumbersome to frequently determine the concentration of one or more components (e.g., utilizing titration, or sensing methods such as reflectance). Such methods may be labor intensive, may require expensive additional chemistries (e.g., for titration), and/or may require expensive instrumentation. It would be desirable to provide a simple and reliable method for rapidly determining concentration of one or more components of such a formulation.

As will be appreciated by those skilled in the art, various combinations of the foregoing challenges associated with delivery of multi-constituent feed materials are also inherent to fluid-utilizing processes in contexts other than CMP, including, but not limited to, food and beverage processing, chemical production, pharmaceutical production, biomaterial production, and bioprocessing.

It would be desirable to mitigate the foregoing problems in supplying feed materials to fluid-utilizing processes employing fluid-containing process materials.

SUMMARY OF THE INVENTION

The present invention relates to systems and methods for delivery of fluid-containing process materials to fluid-utilizing processes.

In one aspect, the invention relates to a method including use of a collapsible liner disposed within an overpack container defining an interstitial space between the liner and container, the method comprising applying subatmospheric pressure to the interstitial space to cause the liner to expand and draw the feed material from a feed material source into an interior volume of the liner.

In another aspect, the invention relates to a feed material transport system comprising: (A) a plurality of first feed material flow controllers arranged in parallel and in fluid communication with a first feed material source; and (B) at least one flow consolidation element operatively arranged to selectively combine flows of the first feed material from the plurality of first feed material flow controllers when multiple flow controllers of the first flow controllers are operated simultaneously.

In a further aspect, the invention relates to a method comprising: (A) flowing a first feed material from a first feed material source through a plurality of first feed material flow controllers in parallel; (B) selectively operating at least some flow controllers of the plurality of first flow controllers to reduce deviation or error in total flow rate; and (C) combining flows of the first feed material from the plurality of first feed material flow controllers if multiple flow controllers of the first flow controllers are operated simultaneously.

A further aspect of the invention relates to a system comprising: (A) a plurality of feed material pressure dispensing containers containing a plurality of feed materials, wherein each pressure dispensing container comprises a collapsible liner disposed within an overpack container defining an interstitial space between the liner and overpack container, and wherein each pressure dispensing container contains a different feed material within the collapsible liner thereof; (B) at least one pressurization control element arranged to control pressurization of the interstitial space of each pressure dispensing container of the plurality of pressure dispensing containers; and (C) at least one consolidation element arranged to combine feed materials dispensed by the plurality of feed material pressure dispensing containers, wherein each pressure dispensing container comprises a feed material port in fluid communication with the interior volume of the liner, and at least one port in fluid communication with the interstitial space and in fluid communication with a depressurization apparatus adapted to depressurize the interstitial space.

A still further aspect of the invention relates to feed material blending method utilizing (i) a plurality of feed material pressure dispensing containers containing a plurality of feed materials, wherein each pressure dispensing container comprises a collapsible liner disposed within an overpack container defining an interstitial space between the liner and overpack container, and wherein each pressure dispensing container contains a different feed material within the collapsible liner thereof, (ii) at least one pressurization control element arranged to control pressurization of the interstitial space of each pressure dispensing container of the plurality of pressure dispensing containers; and (iii) at least one consolidation element arranged to combine feed materials dispensed by the plurality of feed material pressure dispensing containers; the method comprising: (A) dispensing feed materials from the plurality of pressure dispensing containers; (B) generating a plurality of different combinations of at least two feed materials of the plurality of feed materials; and (C) testing the plurality of different combinations to determine one or more feed material combinations operative or optimal for an intended use.

Yet another aspect of the invention relates to method for determining concentration of at least one component of a multi-component solution or mixture wherein density of each individual component of the solution or mixture is known, the method comprising the following steps (A) and (B): (A) measuring head pressure exerted by the solution or mixture within a column of a given height, or measuring total mass of the solution or mixture disposed within a fixed volume vessel; and (B) calculating concentration of at least one component of the solution or mixture from the results of the measuring step.

Other aspects, features and embodiments of the invention will be more fully apparent from the ensuing disclosure and appended claims.

BRIEF DESCRIPTION OF THE DRAWINGS

FIGS. 5A-5G are tables including results of computations of flow precision and concentration precision for feed material transport systems including multiple feed material sources, with at least one feed material source including multiple flow controllers disposed in parallel and operative to control flow of feed materials at least one feed material source.

DETAILED DESCRIPTION OF THE INVENTION, AND PREFERRED EMBODIMENTS THEREOF

Figure 1A:
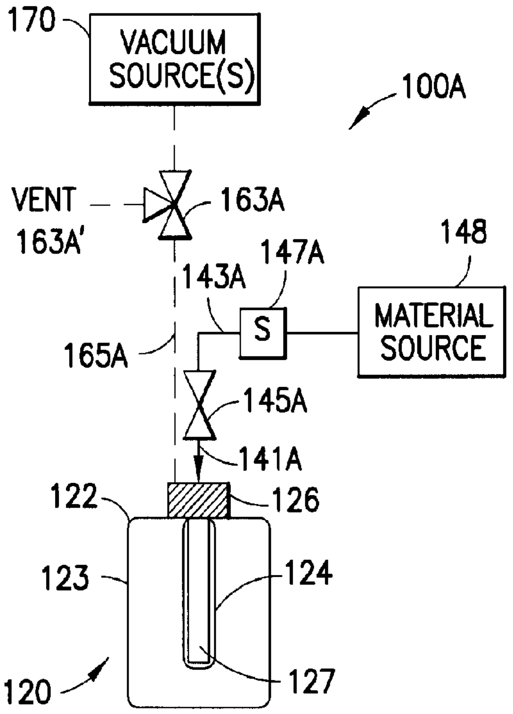
FIG. 1A is a schematic showing interconnections between various components of a vacuum-based system for filling a liner-based pressure dispensing container from a material source, with the liner being in a first, collapsed state.

The disclosures of the following patents and patent applications are hereby incorporated herein by reference in their respective entireties: U.S. Pat. No. 7,188,644 entitled "APPARATUS AND METHOD FOR MINIMIZING THE GENERATION OF PARTICLES IN ULTRAPURE LIQUIDS;" U.S. Pat. No. 6,698,619 entitled "RETURNABLE AND REUSABLE, BAG-IN-DRUM FLUID STORAGE AND DISPENSING CONTAINER SYSTEM;" International Patent Application Publication No. WO2008/141206 entitled "SYSTEMS AND METHODS FOR MATERIAL BLENDING AND DISTRIBUTION;" and International Patent Application No. PCT/US08/85826 entitled "SYSTEMS AND METHODS FOR DELIVERY OF FLUID-CONTAINING PROCESS MATERIAL COMBINATIONS."

The present invention relates in various aspects to systems and methods for delivery and use of fluid-containing process materials to fluid-utilizing processes, including (but not limited to) processes employed in semiconductor and microelectronic device fabrication, and manufacturing of products incorporating such systems and methods.

Various embodiments of the present invention involve use of substantially pure feed materials supplied to or from containers each including a compressible portion defining an internal volume, such as a collapsible liner disposed within a housing or overpack container. The housing or overpack may be of any suitable material(s) of construction, shape, and volume. A sealable volume between each liner and housing or overpack may be pressurized to discharge the contents of the liner from the container to a mixing apparatus or flow directing element(s) in at least intermittent fluid communication with each internal volume, and arranged to selectively control flow of such contents for agitation and/or mixing thereof. Discharge of the liner contents may be driven solely by such pressurization, or driven at least in part by other conventional means (e.g., gravity, centrifugal force, vacuum extraction, or other fluid motive means), and assisted with such pressurization.

The term "mixing apparatus" as described herein encompasses a wide variety of elements adapted to promote mixing between two or more materials. A mixing apparatus may include a region wherein two or more materials are combined. Static and/or dynamic mixing apparatuses may be used. Preferably, a mixing apparatus as described herein comprises a flow-through mixing apparatus through which two or more materials are flowed to effect desirable mixing or blending therebetween. In one embodiment, a mixing apparatus comprises a tee or similar branched fluid manifold wherein multiple flowable materials are brought together in two or more legs or conduits and the flowable materials in combination flow into a third leg or conduit. A mixing apparatus may include one or more elements (e.g., a venturi, orifice plate, or the like) adapted to cause contraction and expansion of fluid streams subject to flowing therethrough. A mixing apparatus may include one or more elements adapted to add or conduct energy (e.g., kinetic energy, magnetic energy, or the like, including but not limited to mechanical shaking or agitation, application of sonic energy or vibration, and the like) to material therein. In one embodiment, a mixing apparatus comprises a reversible-flow mixing apparatus adapted to permit two or more combined fluid streams to repeatedly traverse a flow path. Preferably, such a reversible-flow mixing apparatus includes fluid conduits and/or flow directing components operatively connected to one or more liner-based containers adapted for pressure dispensing, wherein a space between a collapsible liner and a substantially rigid container wall surrounding the liner may be selectively pressurized or de-pressurize to effectuate fluid flow. In another embodiment, a mixing apparatus comprises a circulatable-flow mixing apparatus adapted to permit two or more combined fluid streams to circulate within a flow path (e.g., without reversal). Preferably, such a circulatable-flow mixing apparatus includes a circulation loop with fluid conduits and/or flow directing components (e.g., valves) intermittently connected to one or more liner-based containers, such that material(s) from such container(s) may be dispensed into the mixing apparatus for mixing therein. At least one dispensing port is preferably provided in selective communication with the circulation loop.

A container as described herein preferably defines a compressible volume therein and is preferably adapted for selective material discharge therefrom. Such volume may be bounded or defined by at least one of a bag, a bladder, a bellows, a collapsible liner, a flexible container wall, and a moveable container wall to permit compression or full collapse of the compressible volume. A container may include a non-rigid liner or other substantially non-rigid element defining the compressible volume and disposed within a generally rigid housing or overpack (e.g., a housing or overpack substantially more rigid than the liner).

In one embodiment, each collapsible liner may be filled with a feed material in a zero headspace or near-zero headspace conformation to minimize or substantially eliminate any air- or gas-material interface within the liner, to as to minimize the amount of particles shed from the liner into the feed material. Each liner may be filled in a complete fashion, or, if desired, partially filled followed by headspace evacuation and sealing to permit the liner to expand or receive additional materials in the course of a mixing process. In the context of liquid materials, the presence of an air-liquid material interface in the container has been shown to increase the concentration of particles introduced into the liquid, whether during filling, transportation, or dispensation. Substantially chemically inert, impurity-free, flexible and resilient polymeric film materials, such as high density polyethylene, are preferably used to fabricate liners for use in containers according to the present invention. Desirable liner materials are processed without requiring co-extrusion or barrier layers, and without any pigments, UV inhibitors, or processing agents that may adversely affect the purity requirements for feed materials to be disposed in the liner. A listing of desirable liner materials include films comprising virgin (additive-free) polyethylene, virgin polytetrafluoroethylene (PTFE), polypropylene, polyurethane, polyvinylidene chloride, polyvinylchloride, polyacetal, polystyrene, polyacrylonitrile, polybutylene, and so on. Preferred thicknesses of such liner materials are in a range from about 5 mils (0.005 inch) to about 30 mils (0.030 inch), as for example a thickness of 20 mils (0.020 inch).

Sheets of polymeric film materials may be welded (e.g., thermally or ultrasonically) along desired portions thereof to form liners. Liners may be either two-dimensional or three dimensional in character. A liner includes at least one port or opening, preferably bounded by a more rigid material, for mating with, engaging, or otherwise disposed in flow communication with a corresponding orifice of a housing or cap thereof to enable fluid communication with the interior of the liner. Multiple ports may be provided.

A housing surrounding a liner is preferably formed of a material suitable to eliminate the passage of ultraviolet light, and to limit the passage of thermal energy, into the interior of the container. In this manner, a feed material disposed within the liner contained by the housing may be protected from environmental degradation. The housing preferably includes a gas feed passage to permit pressurization of a sealable volume between the liner and the interior surface(s) of the housing to discharge feed material from the liner. In this regard, feed material may be pressure dispensed without use of a pump contacting such material. In certain embodiments, the gas feed passage may also be selectively connectable to a vent to relieve pressure within the sealable volume as desired.

Containers including liners and housings as described hereinabove are commercially available from Advanced Technology Materials, Inc. (Danbury, Conn.) under the trade name NOWPAK®.

One aspect of the present invention relates to a vacuum-based system for filling a liner-based pressure dispensing container from a material source. Traditionally, liner-based pressure dispensing containers have been filled by installing a liner in an overpack container, expanding or inflating the liner within the overpack container, and then pumping feed material into the liner.

Figure 1B:
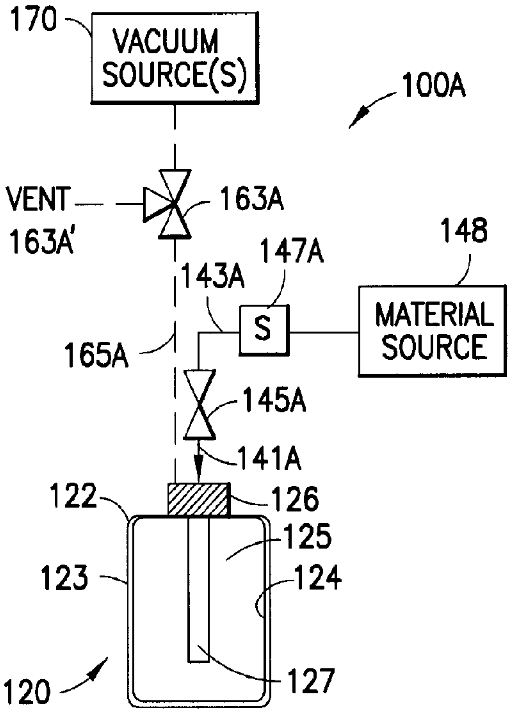
FIG. 1B is a schematic showing interconnections between various components of the vacuum-based filling system of FIG. 1A, with the liner being in a second, expanded state.

A vacuum-based filling system that overcomes various limitations associated with conventional systems for filling liner-based pressure dispensing containers is illustrated in FIGS. 1A-1B. The system 100A includes a pressure dispensing container 120 having an overpack 122, a collapsible liner 124 defining an interior volume 125, an interstitial space 123 between the overpack 122 and the liner 124, an optional dip tube 127, and a cap 126 having a feed material transfer port (not shown) arranged for fluid communication with the interior volume 125, and having at least depressurization port (not shown) arranged for fluid communication with the interstitial space 123 and in fluid communication with a depressurization apparatus (e.g., vacuum pump, eductor, vacuum chamber, or the like) adapted to depressurize the interstitial space 123. The depressurization port may also selectively provide pressurization utility (such as to promote pressurization of the interstitial space 123 for dispensing contents from the liner 124); alternatively, a separate pressurization port may be provided. A vacuum source 170 is coupled to the depressurization port by way of flow line 165A and a vent valve 163A having an associated vent 163A'. A material source 148 is coupled to the feed material transfer port by way of flow lines 141A, 143A and a feed material valve 145A. One or more sensors 147A (e.g., adapted to sense flow, pressure, temperature, pH, and/or material composition) may be disposed within any of the flow lines 141A, 143A between the material source 148 and the pressure dispensing container 120. Such sensor(s) 147A may monitor feed material being supplied to the liner 124, with operation of the vacuum source 170 optionally being responsive to a signal generated by the sensor(s) 147A.

FIG. 1A shows the liner 124 being in a first, collapsed state, whereas FIG. 1B shows the liner in a second, expanded state. In operation of the filling system 100A, a liner 124 is installed into the overpack container 122. The liner 124 may be installed in an initially collapsed state, or vacuum may be applied through the material fill port via an optional vacuum connection (not shown) to collapse the liner 124. The feed material valve 145A is opened, and with the vent valve being positioned to close the vent 163A', the vacuum source 170 is activated to establish subatmospheric conditions in the interstitial space 123. This subatmospheric condition causes the liner 124 to expand, thus drawing feed material from the feed material source 148 into the interior volume 125 of the liner 124. Vacuum conditions may be maintained in the interstitial space 123 even after the liner 124 has been filled with feed material, in order to evacuate gas that may migrate from the interior volume 125 through the liner 124 into the interstitial space, or material that may outgas from the surface of the liner 124. Such vacuum extraction may be maintained as long as desirable or necessary. In one embodiment, a sensor (not shown) is arranged in the vacuum extraction line 165A to sense presence of gas that has migrated through the liner 124, and vacuum extraction conditions may be maintained responsive to an output signal of the sensor, until the sensor registers an absence of gas or presence of gas below a threshold level. At the conclusion of the filling process and any subsequent vacuum extraction step, the feed material valve 145A is closed, and the depressurization port and feed material port are closed, and the container 120 is readied for transport and/or use.

Figure 1C:
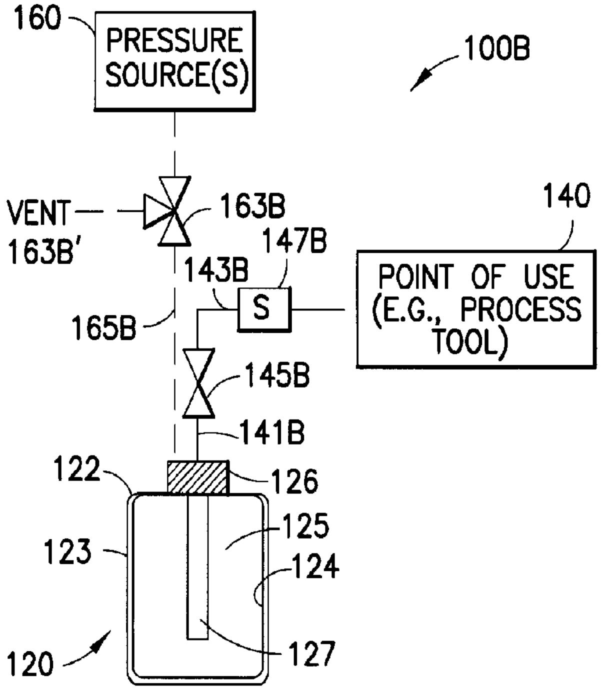
FIG. 1C is a schematic showing interconnections between various components of a pressure-based system for dispensing contents from the liner-based dispensing container of FIGS. 1A-1B.

FIG. 1C shows a pressure-based dispensing system 100B for dispensing feed material from the pressure dispensing container 120 after the liner 124 of such container 120 has been filled with feed material. A pressure source 160 is connected by way of a pressurization line 165B and a vent valve 163B (having an associated vent 163B') to a pressurization port of the container 120. A feed material valve 145B and an optional at least one sensor 147B are disposed in feed material lines 141B, 143B disposed between the container 120 and a point of use 140.

In operation of the system 100B, the feed material valve 145B is opened, and the vent valve 163B is positioned to close the vent 163B' and permit flow of pressurizing fluid (e.g., preferably a gas) therethrough. Pressurizing fluid is supplied through a pressurization port defined into the cap 126 to pressurize the interstitial space 123, thus compressing the liner 124 and causing contents of the liner 124 to be expelled through the optional dip tube 127 to exit the container through the feed material transfer port defined in the cap 126. Feed material flows through lines 141B, 143B, the feed material valve 145B, and the optional sensor(s) 147B to reach the point of use 140. The sensor(s) 147B may be arranged to provide metering utility on a mass or volumetric basis and generate an output signal, and supply of pressure to the interstitial space 123 may be responsive to such metering. If the pressure source 160 does not include integral flow control utility, then a flow controller or other regulating apparatus (not shown) may be disposed between the pressure source 160 and the interstitial space 123.

In one embodiment, the point of use 140 comprises a process tool adapted for use of the feed material in the manufacture of a product. The product may include at least one of a semiconductor device, a semiconductor device precursor, a microelectronic device (e.g., a microchip, a microchip-based device, display, a sensor, and a MEMS device), and a microelectronic electronic device precursor (e.g., a substrate, an epilayer, a glass panel for a liquid crystal display, etc.). A process tool may include a chemical mechanical planarization (CMP) tool. The feed material formulation supplied to such a tool may include a CMP slurry, typically involving or one or more solids suspended or otherwise disposed in one or more liquids. A product may alternatively embody a chemical agent, a pharmaceutical product, or a biological agent.

Figure 2:
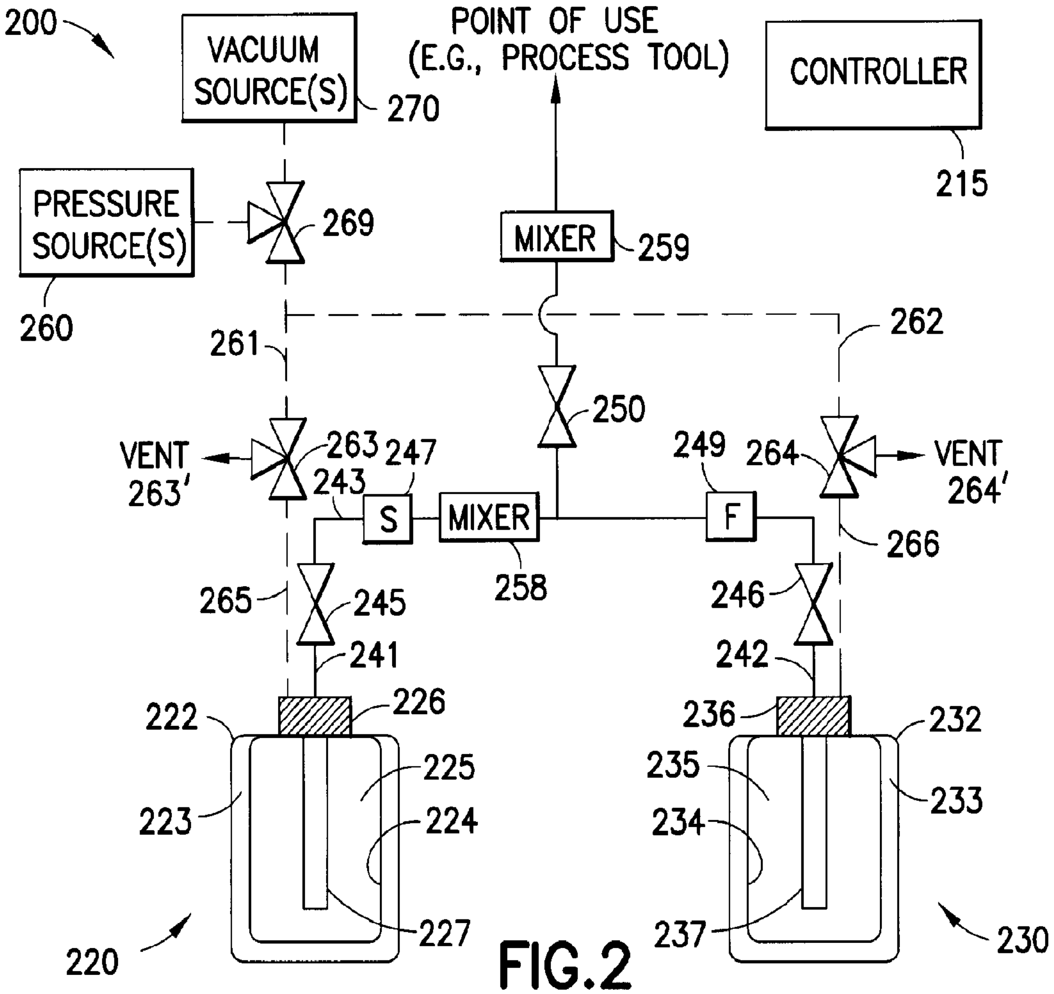
FIG. 2 is a schematic showing interconnections between various components of a system for transferring and mixing feed materials between two liner-based pressure dispensing containers, and for dispensing the feed materials to a point of use.

In one embodiment, at least one vacuum source may be utilized in a system arranged to mix feed materials from multiple liner-based pressure dispensing containers. Referring to FIG. 2, a mixing system 200 includes a reversible-flow mixing apparatus with a flow path that includes the collapsible liner 224 of a first container 220 and the collapsible liner 234 of a second container 230. Direction of material flow to and/or from each container 220, 230 may be selectively controlled, from a first direction to a second direction (and vice-versa) in a fluid path. Any desirable flow directing elements may be provided to selectively control material flow for agitation and/or mixing thereof. Two or more containers 220, 230 in a dispensing system may be configured to operate in any desired mode of mixing, agitation, and/or dispensation.

The system 200 includes a first container 220 having a first housing 222 containing a first collapsible liner 224. A first sealable volume (interstitial space) 223 is defined between the first housing 222 and the first collapsible liner 224, and is in communication with a gas flow passage defined in the first cap 226, which includes at least one depressurization and/or pressurization port in communication with the interstitial volume 223, and a feed material transfer port in communication with the interior volume 225 (e.g., via the optional dip tube 227). The system 200 further includes a second container 230 substantially identical in type to the first container 220, but preferably containing a different feed material within the interior volume 235 of the second liner 234. The second container 230 includes a second housing 232 containing a second collapsible liner 234, with a second sealable volume (interstitial space) 233 disposed therebetween. A second cap 236 fitted to the second container 230 includes at least one pressurization and/or depressurization port in communication with the interstitial volume 233, and a feed material transfer port in communication with the interior volume 235 (e.g., via the optional dip tube 237).

Isolation valves 245, 246 may be provided in discharge conduits 241, 242, respectively, to enable selective isolation of containers 220, 230 and the mixing system, such as to permit new containers to be added to the system 200 upon depletion of the contents of containers 220, 230. A mixing conduit 243 extends between the isolation valves 245, 246, and disposed along a mixing conduit 243 are optional material property sensor 247, optional flow sensor 249, and an outlet valve 250, preferably in selective fluid communication with a downstream process tool. Alternatively, such mixture may be provided to a storage receptacle or other desired point of use.

At least one vacuum source 270, optionally in conjunction with at least one pressure source 260, is provided in selective fluid communication with the first interstitial space (sealable volume) 223 of the first container 220 and with the second interstitial space (sealable volume) 233 of the second container 230, and may be used to cause fluid to flow from one container to the other container, and vice-versa. Disposed between the at least one vacuum source 270 (and optional pressure source 260) and the containers 220, 230 are valves 263, 264. Valve 263 is selectively operable to open a flow path between the at least one vacuum source 270 (and optional pressure source 260) and the first interstitial volume 223 via conduits 261, 265, and further operable to release vacuum (or pressure) from the first interstitial volume 223 via a vent 263'. Likewise, valve 264 is selectively operable to open a flow path between the at least one vacuum source 270 (and optional pressure source 260) and the second is sealable space 233 via conduits 262, 266, and further operable to release vacuum (or pressure) from the second sealable space 233 via a vent 264'. Such valves are selectively controlled. Each valve 263, 264 is preferably a three-way valve, or may be replaced with two two-way valves.

The length and diameter of the mixing conduit 243 may be selected to provide a desired volume between the two containers 220, 230. One or more optional flow restriction elements (not shown), such as orifices or valves, may be disposed within the mixing conduit 243 to enhance mixing action as desired.

In operation of the mixing system, a flow path including the mixing conduit is opened between the two containers 220, 230, and one liner (e.g., liner 224) is initially in at least a partially collapsed state. The interstitial space 223 of the first container 220 is depressurized to a subatmospheric state to cause the first liner 224 therein to expand (while the interstitial space 233 of the second container 230 is not depressurized). Such expansion of the first liner 224 draws suction on the mixing conduit 243, thus drawing feed material from the interior volume 235 of the second liner 234 of the second container 230. Feed material thus flows from the second container 230 to the first container 220. The process may be reversed by venting the first interstitial space 233, and then depressurizing the second interstitial space 233 to cause material to flow from the first liner 224 to the second liner 234. Transit of first and second feed materials through the mixing conduit 243 causes the materials to mix, with such mixing optionally aided by mixing element 258, which may provide static or dynamic mixing utility. Homogeneity of the mixture may be sensed by sensor(s) 247. Such sensor(s) 247 may measure any desirable one or more characteristics of the mixture, such as a conductivity, concentration, pH, and composition. In one embodiment, the sensor 247 comprises an particle sensor, such as an optoelectrical particle size distribution sensor. In another embodiment, the sensor 247 comprises a high purity conductivity sensor. Material movement, mixing, and/or dispensation may be controlled responsive to a signal received from the sensor(s) 247. In one embodiment, the sensor 247 is used to determine the end point of a mixing process. The flow sensor 249 may be similarly used to monitor mixing progress. For example, if the first feed material and the second feed material have very different viscosities, then existence of a substantially constant flow rate through the mixing conduit 243 after multiple reversals of flow may indicate that mixing is near completion.

Mixing may be sustained even after a uniform blend is obtained to maintain uniformity of the blend. Upon attainment of a desired homogeneity or desired number of mixing cycles, the mixed feed material may be supplied through a valve 250 and optional additional mixer 250 to a point of use such as a process tool. Such movement may be caused, for example, by pressurization of one or both interstitial spaces 223, 233 via the pressurization source 260, or by extraction with a vacuum pump or other pump (not shown) associated with the point of use downstream of the mixer 259.

It is to be appreciated that operation of any of the various elements of the system 10 is amenable to automation, such as with a controller 215. Such controller 215 may further receive sensory input signals (e.g., from sensors 247, 249) and take appropriate action according to pre-programmed instructions. In one embodiment, the controller comprises a microprocessor-based industrial controller or a personal computer.

For applications in which the desired liquid is delivered in large volumes, an intermediate station may be set up between a tote size chemical storage container and the point of use. Such intermediate station may include a single transfer stage such as a day tank. Alternatively, an intermediate station may include multiple transfer containers to enable continuous operation, as one transfer container may be changed while another is in operation. One or more containers of an intermediate station may be comprise liner-based pressure dispensing vessels, to eliminate need for additional pumps and associated maintenance, and also eliminate contamination from carryover by utilization of changeable container liners.

Figure 3:
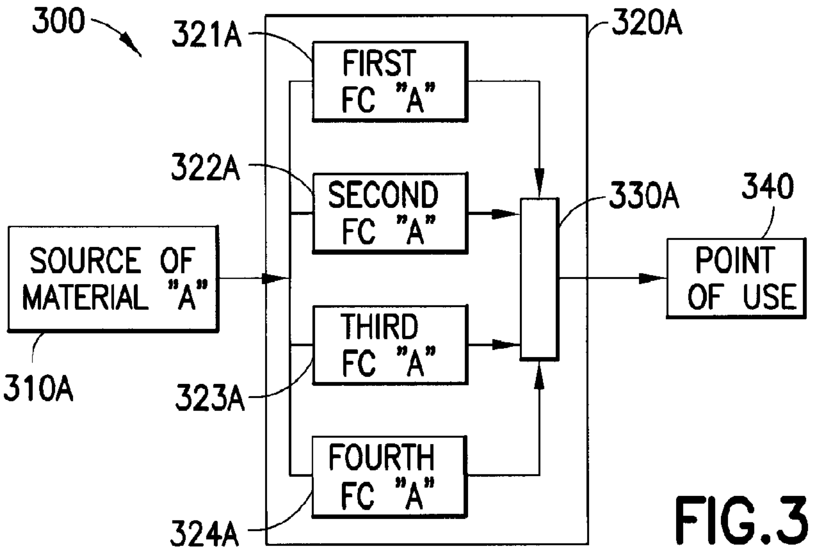
FIG. 3 is a schematic of a feed material transport system including multiple flow controllers disposed in parallel and operative to control flow of feed material from a single feed material source.

Another aspect of the invention relates to control of dispensation of one or more fluids over a wide range of desired flow rates, wherein at least one fluid is subject to dispensation through multiple flow controllers in parallel. The term "parallel" in this context refers to a fluid flow path through the controllers, rather than physical placement of the controllers relative to one another. FIG. 3 illustrates a first example of a flow control system 300 involving a flow control subsystem 320A that including multiple parallel flow controllers 321A-324A arranged for parallel operation, and a consolidation element 330A, disposed between a common feed material source 310A and a point of use 340 (including any desirable point of use as disclosed herein, including but not limited to a process tool adapted for use of the first feed material in the manufacture of a product). A shortcoming of using a single flow controller having a high flow capacity is that an increase in flow controller size generally entails an increase in flow variation (thus sacrificing accuracy). The benefit of using multiple flow controllers in parallel is that a very wide range of flow rates may be attained, without entailing a significant increase in flow variation. For example, use of two parallel flow controllers having calibrated flow ranges of 0-50 ml/min may provide an accurate flow range of 5-100 ml/min. In another example, use of three parallel flow controllers having calibrated flow ranges of 0-50, 0-125, and 0-250 ml/min, respectively, yields an accurate flow rate range of from 5-425 ml/min. Use of a single flow controller having a capacity of about 425 ml/min would not achieve such a wide accurate flow rate range, as accuracy would be detrimentally impacted particularly at low flow rates.

In a preferred embodiment, at least two flow controllers of the multiple parallel flow controllers 321A-321D include flow controllers of different ranges of calibrated flow rates. In one embodiment, at least two flow controllers of the multiple flow controllers differ from one another in maximum calibrated flow rate by a factor of at least about two. In another embodiment, with a first, a second, and a third flow controller disposed in parallel, a second flow controller has at least about double maximum calibrated flow rate of a first flow controller, and a third flow controller has at least about double maximum calibrated flow rate of the second flow controller. In one embodiment, at least four flow controllers are provided in parallel, with each preferably having a different range of calibrated flow rate. In one embodiment, multiple parallel flow controllers may be provided for one feed material subject to being blended with at least one other feed material. The at least one other feed material may be supplied through multiple flow controllers in parallel, or supplied through a single flow controller. In another embodiment, two materials are each supplied through multiple parallel flow controller, and a third feed material is supplied through a single flow controller. In another embodiment, four or more feed materials are used, with at least two materials being supplied through multiple parallel flow controllers. In one embodiment, each of two or more flow controllers operable in parallel have substantially the same range of calibrated flow rate, such as may be useful to increase range and/or precision of combined flow passed through the flow controllers.

In a preferred embodiment, each flow controller of a parallel flow controller system comprises a mass flow controller. In another embodiment, each flow controller of a parallel flow controller system comprises a volumetric flow controller. Flow through any one or more flow controllers as described herein may be temperature-corrected and/or pressure-corrected as desirable to promote accuracy.

Figure 4:
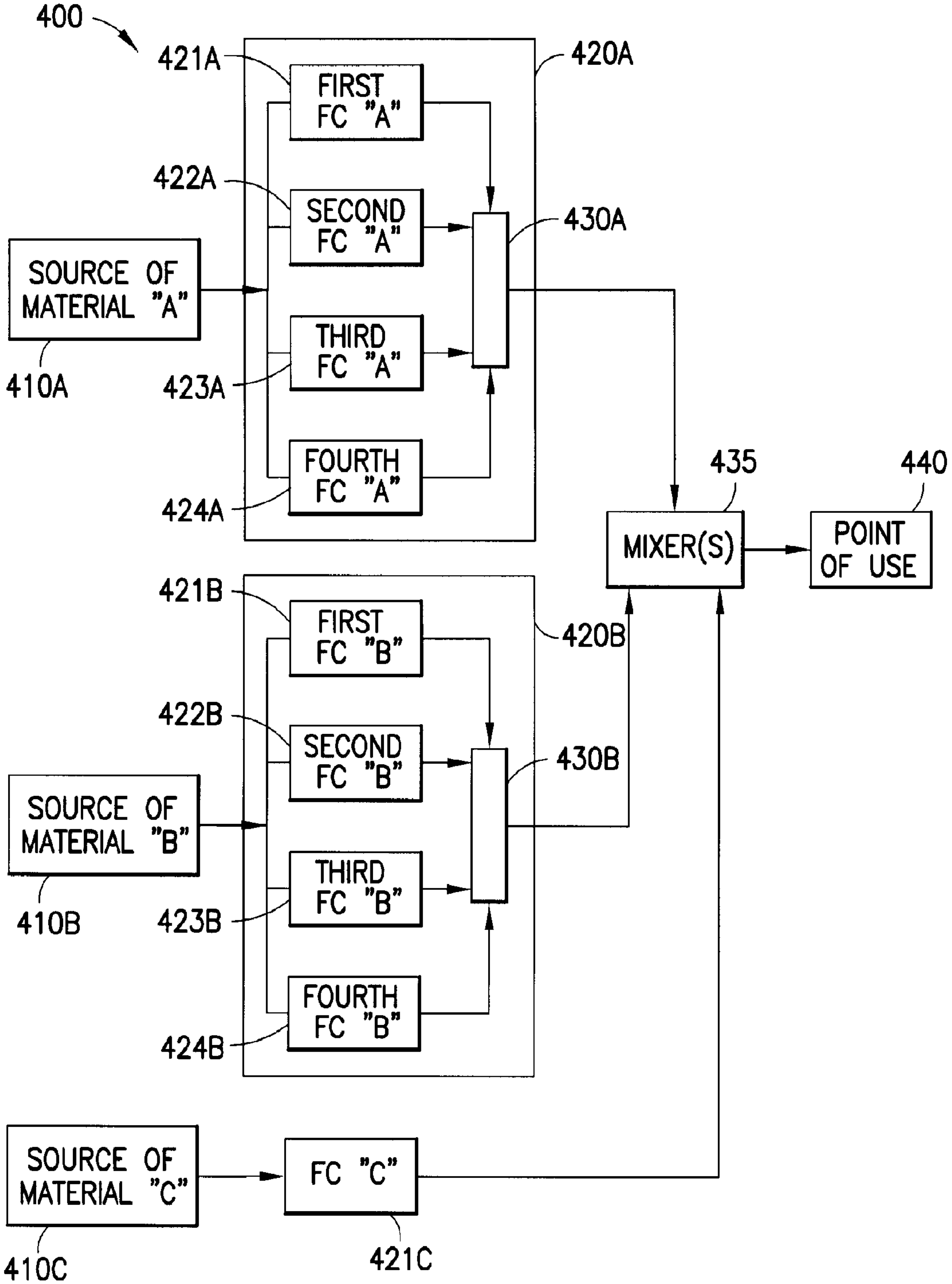
FIG. 4 is a schematic of a feed material transport system including three feed material sources, with two feed material sources including multiple flow controllers disposed in parallel and operative to control flow of feed materials from respective feed material sources, the system being arranged to deliver consolidated or mixed feed materials to a point of use.

FIG. 4 illustrates a feed material transport system including three material sources 410A, 410B, 410C, with two material sources 410A, 410B each having associated therewith multiple parallel flow controller subsystems 420A, 420B, and with the third material source 420C having a single flow controller 421C. The first material flow controller subsystem 420A includes first through fourth parallel flow controllers 421A-424A (wherein at least two flow controllers 421A-424A have different ranges of calibrated flow rates) and at least one flow consolidation element 430A. Preferably, the at least one flow consolidation element 430A is operatively arranged to selectively combine flows (e.g., using actuated valves, not shown) of the first feed material from the plurality of first feed material flow controllers 421A-424A when multiple flow controllers of the first flow controllers 421A-424A are operated simultaneously. The flow consolidation element 430A may comprise one or more tees and/or mixing elements (whether static or dynamic). Multiple flow consolidation elements and/or mixing elements may be provided. Output of the one or more flow consolidation elements 430A may comprise flow in the turbulent regime. Similarly, the second material flow controller subsystem 420B includes first through fourth parallel flow controllers 421B-424B (wherein at least two flow controllers 421B-424B have different ranges of calibrated flow rates) and at least one flow consolidation element 430B. Preferably, the at least one flow consolidation element 430B is operatively arranged to selectively combine flows (e.g., using actuated valves, not shown) of the second feed material from the plurality of second feed material flow controllers 421B-424B when multiple flow controllers of the second flow controllers 421B-424B are operated simultaneously. Output streams from the first and second flow controller subsystems 420A, 420B and the third material flow controller 421C may be supplied to a mixing element 435 to promote mixing between the respective fluid streams. Components of different fluid streams may be reactive with one another. The resulting mixture, solution, and/or reaction product may be supplied to a point of use 440, which may comprise any desirable point of use as described previously herein.

Within a flow controller subsystem 420A, 420B including multiple flow controllers 421A-424A, 421B-424B, at least some flow controllers may be selectively operated to reduce deviation or error in total flow rate. This may be accomplished, for example, by selecting the smallest single or combined range of flow controller(s) to handle the target flow rate. It is desirable to avoid a situation where a flow controller arranged to handle a very high flow rate of feed material is fed a low flow rate of such feed material. One or more flow controllers may be activated, and any remaining flow controller(s) deactivated and isolated with valves (not shown), based a measurement of actual flow or upon comparison of total flow demanded by a controller, to reduce deviation or error in total flow rate.

One skilled in the art of designing flow control systems will appreciate that the size and type of flow controller may be matched to the desired end use application. Based on the disclosure herein of multiple parallel flow controllers as applied to a single feed material, one skilled in the art may further select the appropriate number of flow controllers and flow rate ranges thereof to suit a desired end use application. Generally speaking, however, blending between different feed materials may desirably occur by joining a large stream of one component (e.g., 80 to 90 percent of total flow) with comparatively small streams of all other components. In this manner, the precision of the total flow rate is determined mostly by the precision of the stream through the largest flow controller. Moreover, small variations in any one stream would not substantially affect variation in the other streams.

Examples of selections of flow control ranges for multi-component feed material transport systems, and computations of flow precision and concentration precision for such systems, are identified in FIGS. 5A-5G, as discussed below.

FIG. 5A assumes the mixing of feed materials A and B (Chem A and Chem B) with another feed material, namely, deionized (DI) water. Deionized water is supplied through a single flow controller having a maximum calibrated flow of 250 ml/min, and Chem A and Chem B are each supplied through a single flow controller having a maximum calibrated flow of 50 ml/min, respectively. Total flow rate target is 300 ml/min. The DI water stream makes up 80% of the total stream, with Chem A and Chem B making up the remainder. Even though the precision of the mass flow controllers (MFCs) is 1% of maximum flow, the precision of the total flow rate in this setup is less than 1%—namely, 0.87%—in this example. Small variations in any one stream result in negligible changes of the concentration of Chem A and/or Chem B, as described in connection with FIG. 5B.

In FIG. 5B, the same setup as described in connection with FIG. 5A is used, but individual flow rates have been changed by one standard deviation. The worst case scenario is displayed here, with the DI water flow higher than target, and with Chem A and Chem B flows both being lower than target. The deviation from target concentrations are: 0.54% for DI water; −1.60% for Chem A, and −3.81 for Chem B.

In FIG. 5C, Chem C and Chem D are each supplied through a single flow controller having a maximum calibrated flow of 50 ml/min, respectively, and DI water is supplied through two flow controllers arranged in parallel, including one having a maximum calibrated flow rate of 125 ml/min and another having a maximum calibrated flow rate of 250 ml/min Total flow rate target is 400 ml/min. The DI water stream makes up 82.5% of the total stream, with Chem C and Chem D making up the remainder. Even though the precision of each flow controller is 1% of max flow, the precision of the total flow rate in this set-up is less than 1%—namely, 0.72%—in this example. Small variations in any one stream result in negligible changes of the concentration of Chem C and/or Chem D, as shown in connection with FIG. 5D.

In FIG. 5D, the same setup as described in connection with FIG. 5C is used, but individual flow rates have been changed by one standard deviation. The worst case scenario is displayed here, with the DI water flow higher than target, and with Chem C and Chem D flows both being lower than target. The deviation from target concentrations are: 0.45% for DI water; −1.92% for Chem C, and −2.34 for Chem D. These compare favorably to the figures shown in FIG. 5B, noting that total flow rate is higher (400 ml/min versus 300 ml/min).

In FIG. 5E, DI water is supplied a single flow controller having a calibrated maximum flow rate of 500 ml/min, whereas Chem C and Chem D each continue to flow through a different 50 ml/min flow controller. Target total flow rate is 400 ml/min. The deviation from target concentrations are: 0.51% for DI water; −2.23% for Chem C, and −2.64 for Chem D. Despite use of a single flow controller for the DI water, reasonably good precision is obtained—due to relatively high flow through the DI water flow controller.

In FIG. 5F, DI water is supplied through a single flow controller having a calibrated maximum flow rate of 125 ml/min, whereas Chem C and Chem D each continue to flow through a different 50 ml/min flow controller. Target total flow rate is 200 ml/min. The deviation from target concentrations are: 0.63% for DI water; −2.62% for Chem C, and −3.45 for Chem D. The advantage of using multiple, parallel flow controllers for the DI water becomes evident for this example. At lower flow rates, the smaller flow controller can be used instead of the larger flow controller, thus maintaining good accuracy and precision.

In FIG. 5G, DI water is supplied through a single flow controller having a calibrated maximum flow rate of 500 ml/min, whereas Chem C and Chem D each continue to flow through a different 50 ml/min flow controller. Target total flow rate is 200 ml/min. The deviation from target concentrations are: 1.01% for DI water; −4.41% for Chem C, and −5.23 for Chem D. As compared to prior examples, the disadvantage of using a single flow controller for the DI water is evident at lower flow rates. Note that the concentration deviation widens considerably for Chem C and Chem D as compared to previous examples.

Figure 6:
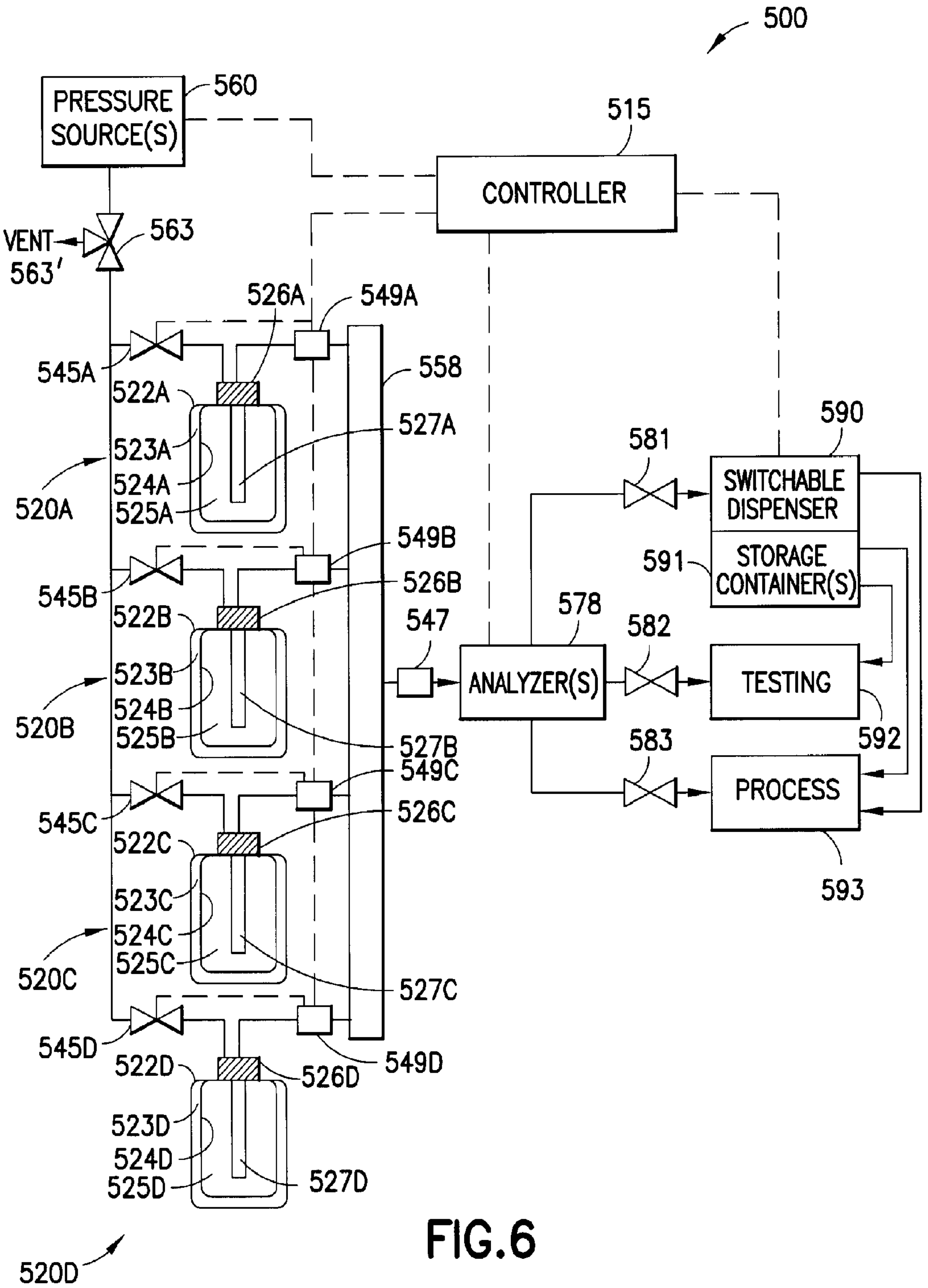
FIG. 6 is a schematic of a system arranged for dispensing, mixing, formulating, testing, and utilizing multiple feed materials, including multiple liner-based pressure dispensing containers.

Another aspect of the invention relates to systems and method for providing a wide variety of multi-component formulations for industrial or commercial use, while avoiding waste of source material and minimizing need for cleaning of constituent storage and/or dispensing components. Referring to FIG. 6, a feed material processing system 500 includes at least one pressure source 560, a vent valve 563 having an associated vent 563', and multiple (e.g., four) liner-based pressure dispensing containers 520A-520D. Each liner-based pressure dispensing containers 520A-520D has an associated overpack 522A-522D, a cap 526A526D defining at least one depressurization and/or pressurization port (not shown) and at least one feed material transfer port (not shown), a collapsible liner 524A-524D defining an internal volume 525A-525D, an interstitial space 523A-523D arranged between the liner 524A-524D and the overpack 522A-522D, and an optional dip tube 527A-527D subject to fluid communication with the feed material transfer port. Each pressure dispensing container 520A-520D has associated therewith a control valve 545A-545D and optional flow sensor 549A-549D, with the control valve 545A-545D arranged to control pressurization of the interstitial space 523A-523D, with the flow sensor 549A-549D arranged to sense flow of feed material supplied through the feed material transfer port, and with operation of the control valve 545A-545D preferably being responsive to an output signal of the flow sensor 549A-549D. One or more flow consolidation elements 558, optionally including at least one static and/or dynamic mixing element, are disposed downstream of the pressure dispensing containers 520A-520D.

One or more sensor(s) 547 and an analyzer 578 (e.g., for sensing flow and/or any desirable characteristic or property of one or more components of a multi-component mixture or solution, or constituents thereof, supplied by the pressure dispensing containers 520A-520D) may be provided downstream of the at least one flow consolidation element 558. A multi-component mixture or solution may be supplied to a switchable dispenser 590 arranged to supply the mixture or solution to a plurality of storage containers 591, and/or to a testing apparatus 592, and/or a process tool 593. The testing apparatus 592 may be used, for example, to determine suitability of, or promote optimization of, different formulations for a desired end use, such as one or more steps in processing of a material or in manufacturing a product or precursor thereof. After an appropriate suitability determination or optimization has been performed by the testing apparatus 592, the system 500 may be operated to scale-up production of larger quantities of one or more desired formulations and supply same to the process tool 593.

The system 500 enables accurate mixing of two or more components (i.e., feed materials or constituents thereof) into a mixture or many different mixtures in a low cost and efficient manner. Each feed material preferably comprises a liquid. In various embodiments, the containers 520A-520D preferably contain at least three, more preferably at least four, different components or feed materials. Five, six, or more feed materials may also be used in the system 500. A single pressure source may be used to drive movement of a large number of different feed materials, thus obviating the need for numerous transfer pumps. Use of liner-based pressure dispensing containers enables different liner materials (e.g., polytetrafluoroethylene, polyethylene, polyester, polypropylene, metallic foils, composites, multi-layer laminates, etc.) to be used for containing different feed materials, and further avoids labor and downtime associated with cleaning of conventional liner-less (e.g., stainless steel) material transfer tanks. Moreover, feed materials may be desirably maintained in a zero-headspace condition in liner-based pressure dispensing containers, therefore minimizing gas-liquid contact and promoting longevity of feed materials disposed for extended periods within the liner of such a container. This reduces chemical waste and associated expense.

The system 500 is particularly well-suited for specialty chemical, pharmaceutical, biochemical scale-up and manufacturing, as well as fields such solar panel and pigment manufacturing. An example directed to formulating copper cleaning formulations suitable for use in tools for fabricating microelectronic devices is described below with reference to FIG. 6. The four liner-based pressure dispensing containers 520A-520D contain different ultra-pure "neat" components (A, B, C, D) of a cleaning formulation used for post-etch copper cleaning. Streams of various proportions of the four neat components A, B, C, and/or D are combined via the one or more consolidation elements 558 to form sixteen different blends/formulations (or any other desirable number of different blends/formulations), which are sequentially flowed through the analyzer 578 to the switchable dispenser 590, and thereby directed into sixteen different storage containers 591 for temporary storage and subsequent transport and/or use. In one embodiment, each combination of feed materials includes all four feed materials; in another embodiment, selected combinations may include fewer components than are present in the feed materials containers 520A-520D. The ratios of the four components A, B, C, D are controlled by the pressure dispense rate and controlled flow of each individual component initially contained in the containers 520A-520D.

Contents of each storage container 591 are tested via the testing apparatus 592 to determine suitability for a desired end use (e.g., copper cleaning utility). The process of generating multiple blends or formulations and testing same may be repeated as necessary to ascertain one or more particularly optimal combinations. Following attainment of test results, one or more beneficially operative or optimal final blends or formulations may be scaled up to manufacturing quantities for testing within a pilot production process, or simply delivered to a process 593. The size of each container 520A-520D may be tailored for the desired quantity of the final products. In one embodiment, each container 520A-520D as illustrated in FIG. 6 and containing a different feed material or component may represent multiple containers, with a primary and alternate container being available for switching from one to the other to enable uninterrupted delivery of feed materials to a blend/formulation optimization run and/or industrial process 593. The process 593 may include a process tool adapted for use of the feed material combination in the manufacture of a product, such as described previously herein. The system 500 may constitute or comprise a part of a feed material blending or formulation apparatus.

Another aspect of the invention relates to a system and method for determining concentration of one or more components of a multi-component solution or mixture, through use of a gravimetric method that avoids use of expensive or labor intensive methods such as reflectance measurement or titration. Titration is very accurate, but it is cumbersome and requires additional chemistries that may be expensive. Reflectance instruments may also be used to accurately sense concentration of one component of a multi-component solution or mixture, but reflectance instruments are typically quite expensive. Use of a simple and reliable method to sense concentration of at least one component of a multi-component solution or mixture is particularly desirable when the solution or mixture is subject to degradation or decomposition over time. By sensing concentration of one or more components prior to use of the solution or mixture, a user can verify that component concentration is within a desired range, and adjust concentration or substitute a different batch of material if necessary to maintain an end use Although the following specific embodiments include references to measurement of hydrogen peroxide in water, it is to be appreciated that measurement systems and methods as disclosed herein are not so limited, and may be utilized with any desired multi-component solution or mixture including at least two components. In one embodiment, the solution or mixture is a binomial solution or mixture including only two components.

Figure 7A:
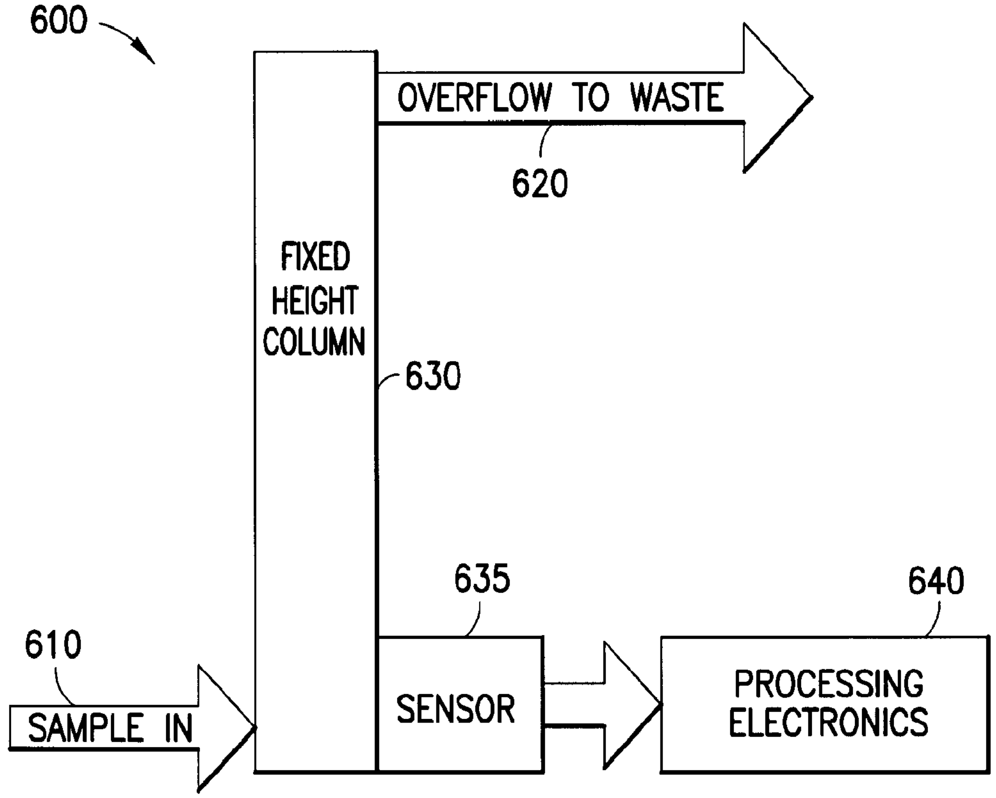
FIG. 7A is a schematic of a gravimetric system for determining concentration of at least one component of a multi-component solution or mixture.
Figure 7B:
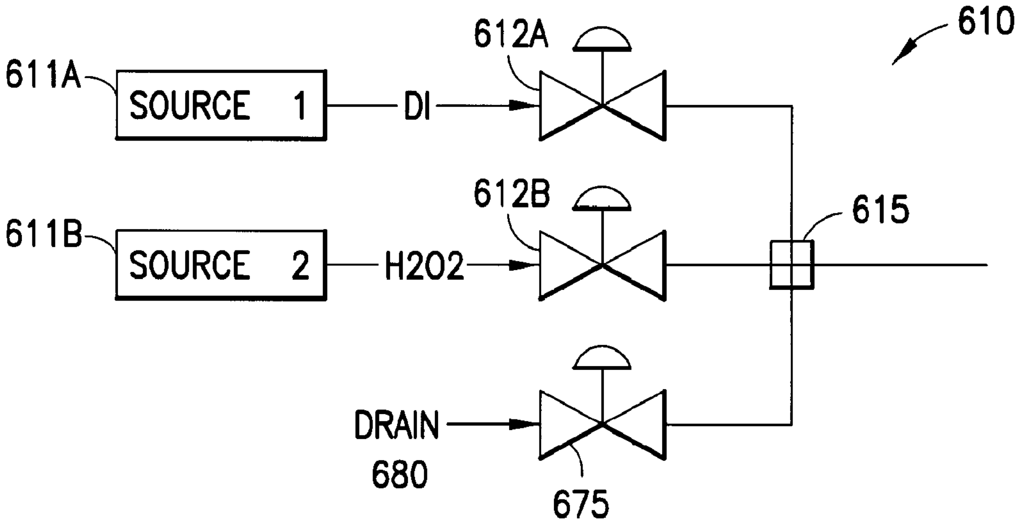
FIG. 7B is a schematic including fluid supply, control, and drain components of a gravimetric system for determining concentration of at least one component of a multi-component solution or mixture, consistent with FIG. 7A.

Referring to FIGS. 7A-7B, one gravimetric method according to the present invention includes supplying first and second components from a sample input 610, including sources 611A, 611B, control valves 612A, 612B, and a flow consolidation element 615, with a drain valve 675 and drain 680 optionally associated with the input 610. Thereafter, the multiple components (e.g., combined as a mixture or solution) are supplied to a fixed height column 630 (e.g., water column), and the pressure exerted by the column 630 is sensed by a sensor 635. Overflow from the column 630 may be directed via an overflow line 620 to waste. The sensor 635 may comprises a pressure sensor of any desirable type. One example of a desirable pressure sensor is a Sensotec series pressure sensor (Honeywell Sensing and Control, Columbus, Ohio). In one embodiment, a strain gauge may be substituted for a pressure sensor and used to provide an output signal indicative of strain, which may be converted to pressure under appropriate conditions. An alternative to using a fixed height column involves supplying the multiple components to a vessel having any convenient size and shape and having a known volume, and then measuring total mass of the contents of the fixed volume vessel. If the densities of the components are known, then the concentration of components may be calculated using processing electronics 640 in signal communication with the sensor 635.

For example, given a multi-component solution of hydrogen peroxide ($H_2O_2$) and water ($H_2O$), it is known that 30% hydrogen peroxide in water weighs 10% more than water alone. If the solution of hydrogen peroxide and water is supplied to a fixed height column, and the pressure exerted by the solution at the bottom of the column is measured, then at around 30% hydrogen peroxide and at room temperature (e.g., 25° C.), hydrogen peroxide concentration may be calculated using the following equation:

$$K = 3 \cdot \left( \frac{PSI_m - PSI_w}{PSI_w} \right),$$

where $PSI_m$ is measured pressure; PSI is pressure of 0% $H_2O_2$, and K is concentration of $H_2O_2$.

For other temperatures and concentrations, either a lookup table or mathematic function fitting curve (corresponding to density versus hydrogen peroxide concentration, readily obtainable or derivable by one skilled in the art without undue experimentation) may be used to determine concentration consistent with the foregoing method utilizing a fixed height column, or measuring pressure exerted by a solution supplied to a vessel having a known, fixed volume.

Measurement resolution of this method may be calculated for utilization of a 5 foot high column. Pressure exerted by a 5 foot (1.52 m) column of pure water is 2.227 psi (15.35 kPa). Pressure exerted by a 5 foot (1.52 m) column of a solution of 30% hydrogen peroxide and 70% water is 2.45 psi (16.89 kPa). Assuming a sensor error range of ±0.05% psi in a pressure range of 0-10 psi, positive and negative error boundaries of 2.455 psi (16.93 kPa) and 2.445 psi (16.86 kPa), respectively, may be established. Utilizing these boundary values in the foregoing formula yields a positive boundary hydrogen peroxide concentration of 30.67%, and a negative boundary hydrogen peroxide concentration of 29.33 percent. Accordingly, the concentration resolution for use of the foregoing method is ±0.67% at a concentration of 30% hydrogen peroxide in water.

The foregoing disclosure indicates that a method for determining concentration of at least one component of a multi-component solution or mixture may include the following steps (A) and (B): (A) measuring head pressure exerted by the solution or mixture within a column of a given height, or measuring total mass of the solution or mixture disposed within a fixed volume vessel; and (B) calculating concentration of at least one component of the solution or mixture from the results of the measuring step.

While the invention has been has been described herein in reference to specific aspects, features and illustrative embodiments of the invention, it will be appreciated that the utility of the invention is not thus limited, but rather extends to and encompasses numerous other variations, modifications and alternative embodiments, as will suggest themselves to those of ordinary skill in the field of the present invention, based on the disclosure herein. Correspondingly, the invention as hereinafter claimed is intended to be broadly construed and interpreted, as including all such variations, modifications and alternative embodiments, within its spirit and scope.

What is claimed is:

1. A method including use of a collapsible liner disposed within an overpack container defining an interstitial space between the liner and container, and a cap operatively coupled with the overpack and defining at least one depressurization port and at least one feed material port in fluid communication with the interior volume of the liner, the at least one depressurization port being in fluid communication with the interstitial space and arranged for depressurization and/or pressurization of the interstitial space, the method comprising:

applying subatmospheric pressure to the interstitial space to cause the liner to expand and draw feed material from a feed material source into an interior volume of the liner; and pressurizing the interstitial space to cause the liner to contract and thereby dispense the feed material from the interior volume through the feed material port, wherein the feed material is dispensed from the interior volume and through the feed material port into a collapsible liner disposed within another overpack container.

2. The method of claim 1, further comprising supplying the dispensed feed material to a process tool adapted for use of the feed material in the manufacture of a product.

3. The method of claim 2, further comprising:

flowing the dispensed feed material through a plurality of feed material flow controllers in parallel;

selectively operating at least some flow controllers of the plurality of flow controllers to reduce deviation or error in total flow rate; and combining flows of the feed material from the plurality of feed material flow controllers if multiple flow controllers of the flow controllers are operated simultaneously.

4. The method of claim 3, wherein at least two flow controllers of the plurality of flow controllers have ranges of calibrated flow rates that differ relative to one another.

5. The method of claim 3, further comprising passing at least about 80% of total flow rate of feed material through one flow controller of the plurality of flow controllers, wherein the total flow of feed material is passable through the plurality of flow controllers.

6. The method of claim 3, wherein each feed material flow controller of the plurality of feed material flow controllers comprises a mass flow controller.

7. The method of claim 3, further comprising:

flowing an other feed material from an other feed material source through an other feed material flow controller; and combining a flow of the other feed material from the other feed material flow controller with a flow of the feed material.

8. The method of claim 7, further comprising supplying the combined flow of the feed material and the other feed material to a process tool adapted for use of the combined flow of the feed material and the other feed material in the manufacture of a product.

9. A feed material supply system comprising a collapsible liner disposed within an overpack container defining an interstitial space between the liner and the overpack container, a cap operatively coupled with the overpack that places the interstitial space in fluid communication with a vacuum source and an interior volume of the liner in fluid communication with a feed material source, to permit application of subatmospheric pressure to the interstitial space to cause the liner to expand and draw the feed material from the feed material source into the interior volume of the liner, wherein a sensor is arranged to sense presence of gas that has migrated through the liner during said application of subatmospheric pressure.

10. The system of claim 9, further comprising a pressurization control element arranged to control at least one of pressurization and depressurization of the interstitial space.

11. The system of claim 9, wherein the liner maintains the feed material in a substantially zero-headspace condition within the liner.

12. A system comprising:

a plurality of feed material pressure dispensing containers containing a plurality of feed materials, wherein each pressure dispensing container comprises a collapsible liner disposed within an overpack container defining an interstitial space between the liner and overpack container, and wherein each pressure dispensing container contains a different feed material within the collapsible liner thereof;

at least one pressurization control element arranged to control pressurization of the interstitial space of each pressure dispensing container of the plurality of pressure dispensing containers; and at least one consolidation element arranged to combine feed materials dispensed by the plurality of feed material pressure dispensing containers;

wherein each feed material pressure dispensing container comprises a feed material port in fluid communication with the interior volume of the liner, and at least one port in fluid communication with the interstitial space and in fluid communication with a depressurization apparatus adapted to depressurize the interstitial space.

13. The system of claim 12, wherein each pressure dispensing container maintains a feed material in a substantially zero-headspace condition within the liner thereof.

14. The system of claim 12, further comprising a chemical analyzer arranged to sense presence and/or concentration of at least one feed material or constituent thereof of the plurality of feed materials.

15. The system of claim 12, further comprising:

a plurality of first feed material flow controllers arranged in parallel and in fluid communication with a first feed material pressure dispensing container of the plurality of feed material pressure dispensing containers; and at least one first flow consolidation element operatively arranged to selectively combine flows of the first feed material from the plurality of first feed material flow controllers when multiple flow controllers of the first flow controllers are operated simultaneously.

16. The system of claim 15, wherein at least two flow controllers of the plurality of first feed material flow controllers have ranges of calibrated flow rates that differ relative to one another.

17. The system of claim 15, further comprising:

a plurality of second feed material flow controllers arranged in parallel and in fluid communication with a second feed material pressure dispensing container of the plurality of feed material pressure dispensing containers; and at least one second flow consolidation element operatively arranged to selectively combine flows of the second feed material from the plurality of second feed material flow controllers when multiple flow controllers of the second flow controllers are operated simultaneously.

18. A method including use of a collapsible liner disposed within an overpack container defining an interstitial space between the liner and container, the method comprising:

applying subatmospheric pressure to the interstitial space to cause the liner to expand and draw feed material from a feed material source into an interior volume of the liner;

maintaining subatmospheric conditions in the interstitial space after the liner has been filled with the feed material in order to evacuate gas migrating through the liner or outgassing from a surface of the liner;

sensing gas extracted from the interstitial space; and terminating; maintenance of subatmospheric conditions in the interstitial space upon sensing of a condition indicative of absence of gas or presence of gas below a threshold level.

* * * * *

UNITED STATES PATENT AND TRADEMARK OFFICE

CERTIFICATE OF CORRECTION

PATENT NO. : 9,038,855 B2
APPLICATION NO. : 13/375462
DATED : May 26, 2015
INVENTOR(S) : Steven M. Lurcott et al.

It is certified that error appears in the above-identified patent and that said Letters Patent is hereby corrected as shown below:

In the claims

In Column 20, Claim 18, Line 30, delete “terminating;” and insert -- terminating --, therefor.

Signed and Sealed this
Tenth Day of November, 2015

*Michelle K. Lee*

Michelle K. Lee
*Director of the United States Patent and Trademark Office*